UNITED STATES PATENT OFFICE.

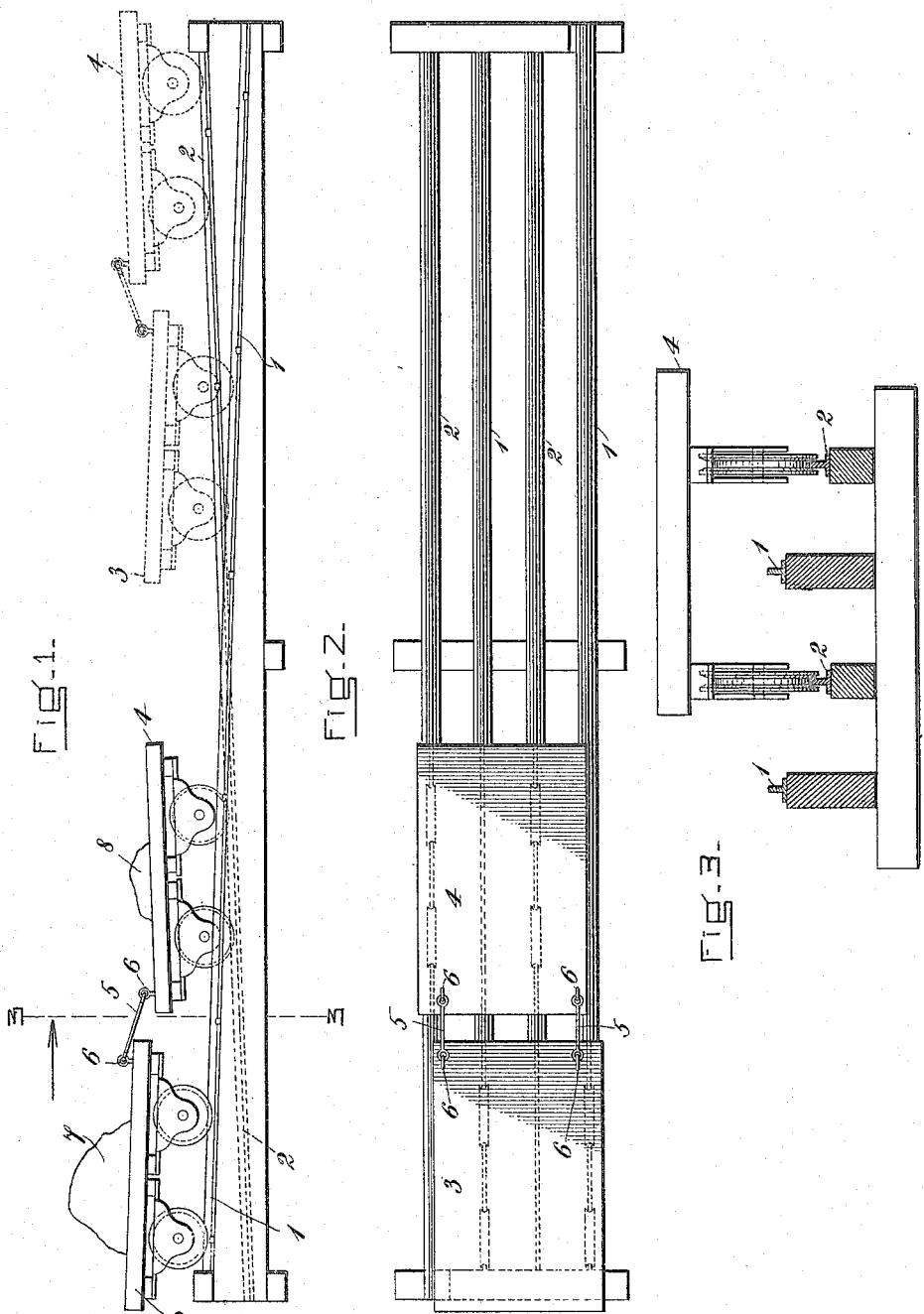

CHARLES A. STEWART, OF ANDOVER, MASSACHUSETTS.

CONVEYER.

1,135,631.

Specification of Letters Patent.

Patented Apr. 13, 1915.

Application filed December 11, 1913. Serial No. 806,075.

*To all whom it may concern:*

Be it known that I, CHARLES A. STEWART, of Andover, in the county of Essex and State of Massachusetts, a citizen of the United States, have invented a new and useful Improvement in Conveyers, of which the following is a full, clear, and exact description, reference being had to the accompanying drawings, forming a part of this specification, in explaining its nature.

The essential object of my invention is to provide a conveyer having separate trucks, cars or objects arranged to run along separate tracks or ways and which are so arranged and so coöperate with one another that gravity may be utilized to effect the movement thereof and load carried thereby through transfer of energy from one car or object to another. This object I am enabled to attain by mounting the separate trucks, cars or objects upon oppositely-inclined tracks whereby they may so coöperate with one another that the energy of one of said members during the downward movement thereof on one of said tracks will operate or work to raise or assist in raising the other of said members on the other of said tracks, thereby effecting a transfer of energy and enabling said other member to restore or assist in restoring said first-named member to its original position or otherwise moving the same as occasion may require.

My invention can best be seen and understood by reference to the drawings in which I have shown diagrammatically an embodiment thereof employing separate trucks each capable of carrying a load and in which—

Figure 1 shows the conveyer in side elevation. Fig. 2 is a plan of the same, and Fig. 3 is a section on the line 3—3 of Fig. 1.

Referring to the drawings:—1 and 2 represent, respectively, separate tracks paralleling one another to extend over substantially the same space in the same general direction but oppositely inclined with relation to one another. The arrangement of the tracks is also preferably such that the inclined planes occupied by the respective tracks may intersect one another within the extension of said tracks. According to the present embodiment of the invention the tracks 1 and 2 each consist of double lines of rails alternately disposed with relation to one another substantially as shown in Figs. 2 and 3. Mounted to run upon these respective tracks are members 3 and 4 of which the member 3 is mounted upon the track 1 and the member 4 upon the track 2. These members are so arranged and so coöperate with one another that as one member is moved downwardly along its track it tends to raise the other member upwardly on its track and for this purpose the members are shown coupled together, the coupling consisting of a bar 5 loosely connecting with each of the members through fastenings 6. It is also to be observed that by reason of the alternate disposition of the rails of the respective tracks the members 3 and 4 mounted thereon are in substantial longitudinal alinement with one another as shown in Fig. 2.

For purposes of illustration I have shown the members or trucks 3 and 4 of equal size and presumably of the same weight. Each truck is shown carrying a load, the load 7 carried by the truck 3 being larger and presumably heavier than the load 8 carried by the truck 4.

The operation is as follows:—As the truck 3 moves down the track 1 it will tend to move the truck 4 upwardly along the track 2 until both trucks have reached the end of the run or carry when they will assume a position substantially as shown in the dotted lines of Fig. 1. This operation is effected by reason of the weight of the truck 3 and heavier load carried by it. Assuming now that the loads are shifted, the load 8 being placed upon the truck 3 and the load 7 upon the truck 4, thereupon the trucks will be returned to their original positions, the truck 4 gravitating downwardly along the track 2 and thereby raising the truck 3 along the track 1 to the position from which it first started. It is of course apparent that the same effect might be obtained if the members or trucks 3 and 4 were made of unequal weight or of such weight that the gravitational movement of one would tend to raise the other, or, in other words, if the weight of the truck 4 was sufficient to raise the truck 3 without a load and the weight of the truck 3 with a load was sufficient to raise the truck 4. The converse is equally true. The truck 3 might be made sufficiently heavy to raise the truck 4 without a load and the truck 4 with a load be sufficient to raise the truck 3. I prefer, however, to make the trucks of equal weight so that a load upon one or the other will operate to move both trucks to one end or the other of the run or carry.

While I have described the operation as one in which gravity alone effects the propulsion of the trucks, it might well be that manual or other power could be employed to assist in such operation although if the tracks be properly inclined and the members or trucks properly weighted no auxiliary power will be necessary to operate them.

Having thus fully described my invention, I claim and desire to secure by Letters Patent of the United States:—

1. A conveyer comprising in combination separate tracks paralleling one another to extend over substantially the same space in the same general direction but oppositely inclined with relation to one another, members mounted to run respectively thereon and coöperating with one another whereby the energy of one during the downward movement thereof on one of said tracks may operate to exert force on the other of said members tending to raise the same on the other of said tracks.

2. A conveyer comprising in combination separate tracks paralleling one another to extend over substantially the same space in the same general direction but oppositely inclined with relation to one another, members mounted to run respectively thereon whereby said members when coupled may coöperate with one another and the energy of one of said members during the downward movement thereof on one of said tracks be transferred to the other of said members for elevating the same on the other of said tracks, and means for coupling said members.

3. A conveyer comprising in combination separate tracks paralleling one another to extend over substantially the same space in the same general direction but oppositely inclined with relation to one another, said tracks being otherwise arranged whereby the inclined planes occupied by said respective tracks may intersect one another within the extension of said tracks, members mounted to run on said respective tracks and coöperating with one another whereby the energy of one during the downward movement thereof on one of said tracks may operate to exert force on the other of said members tending to raise the same on the other of said tracks.

4. A conveyer comprising in combination separate double tracks each having double lines of rails, said respective tracks paralleling one another to extend over substantially the same space in the same general direction but the rails thereof being oppositely inclined and alternately arranged with relation to one another, members in substantial alinement with one another mounted to run upon said respective tracks and coöperating with one another whereby the energy of one during the downward movement thereof on one of said tracks may operate to exert force on the other of said members tending to raise the same on the other of said tracks.

CHARLES A. STEWART.

Witnesses:
 John E. R. Hayes,
 M. D. Newman.

Copies of this patent may be obtained for five cents each, by addressing the "Commissioner of Patents, Washington, D. C."